United States Patent
Makino et al.

(10) Patent No.: US 8,067,096 B2
(45) Date of Patent: Nov. 29, 2011

(54) ELECTRODE MATERIAL FOR ELECTROLYTIC CAPACITOR

(75) Inventors: Takeshi Makino, Tokyo (JP); Masahiko Shinohara, Tokyo (JP); Takeshi Kageyama, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 534 days.

(21) Appl. No.: 12/295,592

(22) PCT Filed: Mar. 31, 2007

(86) PCT No.: PCT/JP2007/057315
§ 371 (c)(1),
(2), (4) Date: Feb. 25, 2009

(87) PCT Pub. No.: WO2007/116845
PCT Pub. Date: Oct. 18, 2007

(65) Prior Publication Data
US 2010/0021719 A1 Jan. 28, 2010

(30) Foreign Application Priority Data

Mar. 31, 2006 (JP) ................. 2006-101097
Mar. 31, 2006 (JP) ................. 2006-101098
Mar. 31, 2006 (JP) ................. 2006-101099

(51) Int. Cl.
*B32B 5/22* (2006.01)
(52) U.S. Cl. ............ 428/550; 428/317.9; 428/613; 428/632; 428/650; 428/687; 428/213; 428/469

(58) Field of Classification Search ............ 428/317.9, 428/546, 550, 552, 613, 632, 650, 687, 213, 428/469
See application file for complete search history.

(56) References Cited

FOREIGN PATENT DOCUMENTS

| JP | 63-160322 A | 7/1988 |
|---|---|---|
| JP | 1-208827 A | 8/1989 |
| JP | 4-196208 A | 7/1992 |

OTHER PUBLICATIONS

Translation of JP-01-208827.*
Translation of JP-04-196208.*

* cited by examiner

*Primary Examiner* — Ling Xu
(74) *Attorney, Agent, or Firm* — Sughrue Mion, PLLC

(57) ABSTRACT

There is provided an electrode material for electrolytic capacitor that attains an unprecedentedly high capacitance. The electrode material for electrolytic capacitor comprises a layer of valve metal particles furnished on the surface thereof with an oxide film, the layer having a porosity of 20 to 60% and a specific surface area of $30 \times 10^3$ to $400 \times 10^3$ cm$^2$/cm$^3$, wherein the valve metal particles are mixed together, with the particle diameters exhibiting a given distribution at least within the range of 0.005 to 0.1 μm, and form a base material surface, and wherein the valve metal consists of aluminum, and wherein the composition ratio of Al/O of the layer of valve metal particles furnished on the surface thereof with the oxide film is within the range of 2.0 to 5.5. The electrode material thus realizes high capacitance.

16 Claims, No Drawings

ELECTRODE MATERIAL FOR ELECTROLYTIC CAPACITOR

BACKGROUND OF THE INVENTION

1. Field of the Invention

The present invention relates to an electrode material for an electrolytic capacitor, and more particularly, to an electrode material for an electrolytic capacitor having unprecedentedly high capacitance properties.

2. Description of the Related Art

Recent smaller and higher-reliability electronic devices strongly demands the smaller size and the higher capacity of an electrolytic capacitor.

An electrolytic capacitor typically has such a structure in which a capacitor element is formed by am anode electrode foil and a cathode electrode foil, wound together with an intervening separator made of manila paper and the like; the anode electrode foil is made of a band-shaped high purity aluminum foil, wherein the effective aluminum foil surface is enlarged through a chemical or electrochemical etching process, and wherein an oxide film is formed on the surface through a chemical process of treating the aluminum foil with chemical solution such as adipic acid ammonium solution and the like; while the cathode electrode foil is made of a high-purity aluminum foil that is subjected only to an etching treatment. Next, the capacitor element, after impregnating with electrolyte solution for driving the electrolytic capacitor, is housed into a bottomed outer case comprising aluminum. The outer case is equipped at the opening with a sealing member comprising an elastic rubber, and is sealed by drawing.

Development of an etching technique is conducted with respect to this type of an aluminum electrolytic capacitor, wherein, aiming to enhance the capacitance thereof, the effective surface area of an etching foil is extended so that the capacitance per unit area will be improved, whereby the effective surface area of the etching foil is extended. As part of such an etching technique, development of etchant composition and of current waveform to be applied at the time of etching is conducted. (Patent Documents 1 and 2).

In addition, an example of such a technique includes one by means of which capacitance is further improved by lowering an etching layer by applying pressure thereto. (Patent Document 3).

In recent years, digitalization of electronic information devices requires an electrolytic capacitor provided with this electrode foil to be smaller-sized and to have higher capacitance and lower impedance in a high frequency region. In particular, in the case of communication devices such as a personal computer or a cellular phone, a capacitor is strongly demanded having much higher capacitance in accordance with the higher operation speed of a CPU employed.

An example of a conventional and widely-used capacitor for a communication device includes a layered ceramic capacitor that meets the demand for miniaturization. However, this capacitor cannot meet the demand for higher capacitance. Hence, an electrolytic capacitor is in use as a capacitor having a low equivalent series resistance value (ESR value) and high capacitance, and allowing for miniaturization.

Besides, some attempts were made with respect to an electrode foil for electrolytic capacitor to achieve a further reduced ESR value by thickening the remaining core portion of an electrode foil, that is, an unetched portion thereof (Patent Documents 4 and 5).

Patent Document 1 Japanese Laid-open Patent Publication No. 2005-203529

Patent Document 2 Japanese Laid-open Patent Publication No. 2005-203530

Patent Document 3 Japanese Laid-open Patent Publication No. H10-189398

Patent Document 4 Japanese Laid-open Patent Publication No. 2003-59768

Patent Document 5 Japanese Laid-open Patent Publication No. 2003-59776

Meanwhile, electrolytic capacitor having such an electrode foil is for use in a vehicle. In vehicle use, the limited space for installation in a vehicle forms a restriction of the space for electronic parts to be employed therein. However, electronic control devices for in-vehicle use have increasing number of functions; an airbag, in particular, operates at an increasing number of places ranging from a cab seat, a passenger seat, a side and a curtain, whereby much higher capacitance is required for an electrolytic capacitor to be used as an energy source for operation of the air bag.

In spite of this, as stated above, the space for installing electrolytic capacitor is limited while the capacitor of the size similar to the conventional ones and having higher capacitance is required. Further, in order to supply energy for all those parts including a cab seat and a curtain, the required amount of capacitance is too high to be supported by an electrolytic foil produced by way of the conventional etching technology.

SUMMARY OF THE INVENTION

Description of the Invention

Accordingly, it is the first object of the present invention to provide with an electrode material for electrolytic capacitor having such high capacitance that could never be achieved when a conventional etching foil is used.

In addition, the demand for higher capacitance is so strong that the conventional electrode foil such as one described in Patent Documents 4 and 5 cannot meet this demand.

It is thus the second object of the present invention to provide with an electrode material for electrolytic capacitor having such high capacitance that could never be achieved when a conventional etching foil is used, and also having a low ESR.

The first electrode material for electrolytic capacitor according to the present invention comprises a layer of valve metal particles furnished on the surface thereof with an oxidation film, the layer having a porosity of 20 to 60% and a specific surface area of $30 \times 10^3$ to $400 \times 10^3$ $cm^2/cm^3$, wherein the valve metal particles are mixed together, with the particle diameters exhibiting a given distribution at least within the range of 0.005 to 0.1 μm, and form a base material surface, and the capacitance of the first electrode material being several times as high as that of conventional electrode foils.

Further, primary particles of the valve metal particles are mixed together, with the particle diameters exhibiting a given distribution at least within the range of 0.005 to 0.1 μm, whereby the capacitance rises by means of the small particles. On the other hand, a cavity can be secured by means of the large particles, whereby clogging caused by oxidation film generated as a result of the reaction with electrolyte solution can thus be inhibited after an electrolytic capacitor is created.

Besides, in the first electrode material for electrolytic capacitor according to the present invention, the valve metal consists of aluminum, and the composition ratio of Al/O of the layer of valve metal particles furnished on the surface thereof with the oxide film is within the range of 2.0 to 5.5, so that the first electrode material can attain stable capacitance, and so that this content of oxygen improves the connectivity among the valve metal particles.

The second electrode material for electrolytic capacitor according to the present invention comprises a layer of valve metal particles furnished on the surface thereof with an oxidation film, the layer having a porosity of 20 to 60% and a specific surface area of $20 \times 10^3$ to $70 \times 10^3$ cm$^2$/cm$^3$. The second electrode material is an electrode material for electrolytic capacitor wherein the valve metal particles include those having particle diameters of 0.2 µm or greater and form a base material surface, and wherein the second electrode material has capacitance that can never be achieved using a conventional electrode foil.

In addition, the above-mentioned electrode material has a layer of valve metal particles comprising the above-mentioned valve metal particles having diameters of 0.2 µm or greater, so that a large cavity can be formed among the valve metal particles. Hence, a cavity is hardly buried with an oxide film even when an anodic oxide film is formed by way of an anodic chemical treatment, and high capacitance can thus be obtained.

Besides, in the second electrode material for electrolytic capacitor according to the present invention, the valve metal consists of aluminum, and the composition ratio of Al/O of the layer of valve metal particles furnished on the surface thereof with the oxide film is within the range of 2.0 to 125, so that the second electrode material can attain stable capacitance, and so that this content of oxygen improves the connectivity among the valve metal particles.

The third electrode material for electrolytic capacitor according to the present invention comprises a layer of valve metal particles furnished on the surface thereof with an oxide film, the layer having a porosity of 20 to 60% and a specific surface area of $30 \times 10^3$ to $400 \times 10^3$ cm$^2$/cm$^3$, wherein the valve metal particles are mixed together, with the particle diameters exhibiting a given distribution at least within the range of 0.005 to 0.1 µm, and form a base material surface of 50 to 200 µm in thickness, and wherein the third electrode material exhibits capacitance several times higher than a conventional electrode foil, and wherein the electrode material has lower resistance.

The fourth electrode material for electrolytic capacitor according to the present invention comprises a layer of valve metal particles furnished on the surface thereof with an oxide film, the layer having a porosity of 20 to 60% and a specific surface area of $30 \times 10^3$ to $400 \times 10^3$ cm$^2$/cm$^3$, wherein the valve metal particles are mixed together, with the particle diameters exhibiting a given distribution at least within the range of 0.005 to 0.1 µm, and form a base material surface comprising a metal other than the above-mentioned valve metal, and wherein the fourth electrode material exhibits capacitance several times higher than a conventional electrode foil, and wherein the electrode material has lower resistance.

Further, in the above-mentioned electrode material, primary particles of the valve metal particles are mixed together, with the particle diameters exhibiting a given distribution at least within the range of 0.005 to 0.1 µm. The capacitance rises by means of the small particles. On the other hand, a cavity can be secured by means of the large particles, whereby clogging caused by oxidation film generated as a result of the reaction with electrolyte solution can thus be inhibited after an electrolytic capacitor is created.

Besides, in the electrode material for electrolytic capacitor according to the present invention, the valve metal consists of aluminum, and the composition ratio of Al/O of the layer of valve metal particles furnished on the surface thereof with the oxide film is within the range of 2.0 to 5.5, so that the first electrode material can attain stable capacitance, and so that this content of oxygen improves the connectivity among the valve metal particles.

The fifth electrode material for electrolytic capacitor according to the present invention comprises a layer of valve metal particles furnished on the surface thereof with an oxide film, the layer having a porosity of 20 to 60% and a specific surface area of $20 \times 10^3$ to $70 \times 10^3$ cm$^2$/cm$^3$. The fifth electrode material is an electrode material for electrolytic capacitor wherein the valve metal particles include those having particle diameters of 0.2 µm or greater and form a base material surface of 50 to 200 µm in thickness, and wherein the fifth electrode material has capacitance that can never be achieved using a conventional electrode foil.

The sixth electrode material for electrolytic capacitor according to the present invention comprises a layer of valve metal particles furnished on the surface thereof with an oxidation film, the layer having a porosity of 20 to 60% and a specific surface area of $20 \times 10^3$ to $70 \times 10^3$ cm$^2$/cm$^3$, wherein the valve metal particles include those having particle diameters of 0.2 µm or greater and form a base material surface comprising a metal other than the valve metal, and wherein the sixth electrode material has capacitance that can never be achieved using a conventional electrode foil.

Further, the above-mentioned electrode material has a layer of valve metal particles comprising the above-mentioned valve metal particles having diameters of 0.2 µm or greater, so that a large cavity can be formed among the valve metal particles. Hence, a cavity is hardly buried with an oxide film even when an anodic oxide film is formed by way of an anodic chemical treatment, and high capacitance can thus be obtained.

Besides, in the electrode material for electrolytic capacitor according to the present invention, the valve metal consists of aluminum, and the composition ratio of Al/O of the layer of valve metal particles furnished on the surface thereof with the oxide film is within the range of 2.0 to 125, so that the first electrode material can attain stable capacitance, and so that this content of oxygen improves the connectivity among the valve metal particles.

In the fourth and sixth electrode materials according to the present invention, a metal other than the aforementioned valve metal is used as a base material. When this other metal is copper or silver, the resistance of the electrode material is reduced, so that the ESR of the electrolytic capacitor that employs the electrode material is reduced.

The electrode material of the present invention has capacitance properties that cannot be achieved with an electrode foil obtained by the etching technology.

As stated above, the electrode material for electrolytic capacitor according to the present invention has high capacitance, and thus, an electrolytic capacitor with unprecedentedly high capacitance can be achieved by using the electrode material for electrolytic capacitor as cathode, or by using the electrode material for electrolytic capacitor as anode by way of anodic oxidation.

In addition, the electrode material of the present invention has capacitance properties that cannot be achieved with an electrode foil obtained by the etching technology, and since the base material is thick and is flatter in comparison with the remaining core of the etching foil, the resistance of the electrode material is also low.

As described above, the electrode material for electrolytic capacitor according to the present invention has high capacitance and low resistance, and thus, an electrolytic capacitor with unprecedentedly high capacitance and low ESR properties can be achieved by using the electrode material for electrolytic capacitor as cathode, or by using the electrode material for electrolytic capacitor as anode by way of anodic oxidation.

DETAILED DESCRIPTION OF THE INVENTION

Description of the Preferred Embodiments

Three embodiments will now be described.

Embodiment 1

The first electrode material for electrolytic capacitor employed in the present invention is an electrode material having a layer of valve metal particles furnished on the surface thereof with an oxide film, where the porosity of the layer of valve metal particles being between 20 and 60%, preferably between 25 and 55%, and even more preferably between 30 and 50%. Besides, the specific surface area is between $30 \times 10^3$ and $400 \times 10^3$ cm$^2$/cm$^3$, preferably between $70 \times 10^3$ and $400 \times 10^3$ cm$^2$/cm$^3$, and even more preferably between $90 \times 10^3$ and $400 \times 10^3$ cm$^2$/cm$^3$.

The specific surface area is calculated from the capacitance and the area of a plain foil, wherein a film having capacitance is formed on the electrode material according to the present invention, and wherein a similar film is formed on the plain foil. Further, porosity can be measured by means of the mercury intrusion technique.

Besides, in the above-mentioned electrode material, primary particles of the valve metal particles are mixed together, with the particle diameters exhibiting a given distribution at least within the range of 0.005 to 0.1 μm. High capacitance can be obtained by such small particles while a cavity can be secured by means of the large particles, whereby clogging caused by oxidation film generated as a result of the reaction with electrolyte solution can thus be inhibited after an electrolytic capacitor is produced. Hence, the greater the number of small particles is, the higher electrostatic capacitance the electrode material can have, while the greater the number of large particles is, the more stable the capacitance can be.

Besides, in the electrode material for electrolytic capacitor according to the present invention, the valve metal consists of aluminum, and the composition ratio of Al/O of the layer of valve metal particles furnished on the surface thereof with the oxide film is within the range of 2.0 to 5.5. The composition ratio of Al and O can be measured and calculated by way of GDS analysis.

An example of the base material includes a variety of metals, and in some cases, resin sheet, and preferably, aluminum. The aluminum is preferably between 99 wt % and 99.999 wt % in purity. The base material is preferably between 15 to 200 μm in thickness.

The aforementioned electrode material can be obtained by way of the conventional deposition method. In order to form a layer of valve metal particles furnished on the surface thereof with an oxide film, a deposition is conducted under the inert gas atmosphere that includes oxygen. An example of the inert gas to be used includes argon and nitrogen. The pressure of the inert gas is preferably between 0.05 and 0.8 Pa, and the oxygen partial pressure is preferably one-tenth or less of the pressure of the inert gas.

The electrode material for electrolytic capacitor according to the present invention is preferably used as a cathode, and can be subjected to cathodic chemical treatment. Further, anodic chemical treatment under super low pressure enables the electrode material to be used as an anodic material for an electrolytic capacitor. An example of the method for chemical treatment typically includes one that is similar to the method for chemical treatment designed for aluminum foil for electrolytic capacitor.

First Example

The present invention is described in more detail with reference to the First Example as described below.

Working Example 1

In an atmosphere consisting of nitrogen under the pressure of 0.1 Pa and oxygen under the pressure of one-tenth or less of that of nitrogen, aluminum was deposited onto an aluminum sheet of 99.9 wt % and 25 μm, whereby the electrode material according to the present invention was created.

Comparative Example 1

An etching treatment was conducted wherein a mixture solution of hydrochloric acid, sulphuric acid and nitric acid was used as an electrolytic solution; and an alternating current with a frequency of 50 Hz or less and at a current density of 1 A/cm$^2$ or less was applied onto an aluminum sheet of 99.9 wt % in such a manner that the core would be 25 μm in thickness, whereby an etching foil was created.

Comparative Example 2

The etching foil of Comparative Example 1 was rolled out to form a pressed-down foil.

Table 1 shows the porosity, the specific surface area and the capacitance of the metal particle layer or of the etching layer of the electrode material, the etching foil and the pressed-down foil.

TABLE 1

|  | Porosity (%) | Specific Surface Area (cm$^2$/cm$^3$) | Capacitance (mF/cm$^3$) |
| --- | --- | --- | --- |
| Working Example | 45 | $2.1 \times 10^5$ | 1350 |
| Comparative Example 1 | 65 | $2.5 \times 10^4$ | 180 |
| Comparative Example 2 | 45 | $4.2 \times 10^4$ | 300 |

As discussed above, Comparative Example 2, in which a pressed-down foil was employed, has capacitance that is 60% higher than a conventional etching foil described in Comparative Example 1. However, the electrode material for electrolytic capacitor according to the present invention exhibits capacitance 7.5 times as high as an etching foil and 4.5 times as high as a pressed-down foil. This reveals the fact the inventive electrode material has capacitance properties that can never be achieved by the conventional etching or pressed-down foils.

Embodiment 2

The second electrode material for electrolytic capacitor employed in the present invention is an electrode material having a layer of valve metal particles furnished on the surface thereof with an oxide film, where the porosity of the layer of valve metal particles being between 20 and 60%, preferably between 22 and 58%, and even more preferably between 25 and 55%. Besides, the specific surface area is between $20×10^3$ and $70×10^3$ cm$^2$/cm$^3$, preferably between $30×10^3$ and $60×10^3$ cm$^2$/cm$^3$, and even more preferably between $35×10^3$ and $55×10^3$ cm$^2$/cm$^3$.

The specific surface area is calculated from the capacitance and the area of a plain foil, wherein a film having capacitance is formed on the electrode material according to the present invention, and wherein a similar film is formed on the plain foil. Further, porosity can be measured by means of the mercury intrusion technique.

In addition, the above-mentioned electrode material has a layer of valve metal particles comprising the above-mentioned valve metal particles having diameters of 0.2 μm or greater furnished on the surface thereof with an oxide film, so that a large cavity can be formed among the valve metal particles. Hence, a cavity is hardly buried with an oxide film even when an anodic oxide film is formed by way of an anodic chemical treatment, and high capacitance can thus be obtained.

Besides, in the electrode material for electrolytic capacitor according to the present invention, the valve metal consists of aluminum, and the composition ratio of Al/O of the layer of valve metal particles furnished on the surface thereof with the oxide film is within the range of 2.0 to 125. The composition ratio of Al and O can be measured and calculated by way of GDS analysis.

An example of the base material includes a variety of metals, and in some cases, resin sheet, and preferably, aluminum. The aluminum is preferably between 99 wt % and 99.999 wt % in purity. The base material is preferably between 15 to 200 μm in thickness.

The aforementioned electrode material can be obtained by way of the conventional deposition method. In order to form a layer of valve metal particles furnished on the surface thereof with an oxide film, a deposition is conducted under the inert gas atmosphere that includes oxygen. An example of the inert gas to be used includes argon and nitrogen. The pressure of the inert gas is preferably between 0.05 and 0.8 Pa, and the oxygen partial pressure is preferably one-tenth or less of the pressure of the inert gas.

The second electrode material for electrolytic capacitor according to the present invention are preferably subjected to an anodic chemical treatment so that the second electrode material is used as an anodic material for electrolytic capacitor. An example of the method for chemical treatment typically includes one that is similar to the method for chemical treatment designed for aluminum foil for electrolytic capacitor.

Second Example

The present invention is described in more detail with reference to the Second Example as described below.

Working Example 2

In an atmosphere consisting of nitrogen under the pressure of 0.1 Pa and oxygen under the pressure of one-tenth or less of that of nitrogen, aluminum was deposited onto an aluminum sheet of 99.9 wt % and 25 μm, whereby the electrode material according to the present invention was created. Then, an anodic treatment was conducted by way of applying 20V of voltage in an adipic acid ammonium solution.

Comparative Example 3

An etching treatment was conducted wherein a mixture solution of hydrochloric acid, sulphuric acid and nitric acid was used as an electrolytic solution; and an alternating current with a frequency of 20 Hz or less and at a current density of 1 A/cm$^2$ or less was applied onto an aluminum sheet of 99.9 wt % in such a manner that the core would be 25 μm in thickness, whereby an etching foil was created. Then, an anodic chemical treatment was conducted in the manner similar to the Working Example.

Comparative Example 4

The etching foil of Comparative Example 3 was rolled out to form a pressed-down foil. Then, an anodic chemical treatment was conducted in the manner similar to the Working Example.

Table 2 shows the porosity, the specific surface area and the capacitance of the metal particle layer or of the etching layer of the electrode material.

TABLE 2

|  | Porosity (%) | Specific Surface Area (cm$^2$/cm$^3$) | Capacitance (mF/cm$^3$) |
|---|---|---|---|
| Working Example 2 | 45 | $5.0 × 10^5$ | 30 |
| Comparative Example 1 | 65 | $2.2 × 10^4$ | 13 |
| Comparative Example 2 | 45 | $3.1 × 10^4$ | 18 |

As discussed above, Comparative Example 2, in which a pressed-down foil was employed, has capacitance that is 40% higher than a conventional etching foil described in Comparative Example 1. However, the electrode material for electrolytic capacitor according to the present invention exhibits capacitance 2.3 times as high as an etching foil and 1.6 times as high as a pressed-down foil. This reveals the fact the inventive electrode material has capacitance properties that can never be achieved by the conventional etching or pressed-down foils.

Embodiment 3

The third and fourth electrode materials for electrolytic capacitor employed in the present invention is an electrode material having a layer of valve metal particles furnished on the surface thereof with an oxide film, where the porosity of the layer of valve metal particles being between 20 and 60%, preferably between 25 and 55%, and even more preferably between 30 and 50%. Besides, the specific surface area is between $30×10^3$ and $400×10^3$ cm$^2$/cm$^3$, preferably between $70×10^3$ and $400×10^3$ cm$^2$/cm$^3$, and even more preferably between $90×10^3$ and $400×10^3$ cm$^2$/cm$^3$.

The specific surface area is calculated from the capacitance and the area of a plain foil, wherein a film having capacitance is formed on the electrode material according to the present invention, and wherein a similar film is formed on the plain foil. Further, porosity can be measured by means of the mercury intrusion technique.

Besides, in the above-mentioned electrode material, primary particles of the valve metal particles are mixed together, with the particle diameters exhibiting a given distribution at least within the range of 0.005 to 0.1 μm. High capacitance can be obtained by such small particles while a cavity can be secured by means of the large particles, whereby clogging caused by oxidation film generated as a result of the reaction with electrolyte solution can thus be inhibited after an electrolytic capacitor is produced. Hence, the greater the number of small particles is, the higher electrostatic capacitance the electrode material can have, while the greater the number of large particles is, the more stable the capacitance can be.

Besides, in the above-mentioned electrode material, the valve metal consists of aluminum, and the composition ratio of Al/O of the layer of valve metal particles furnished on the surface thereof with the oxide film is within the range of 2.0 to 5.5. The composition ratio of Al and O can be measured and calculated by way of GDS analysis.

The electrode material is preferably used as a cathode, and can be subjected to cathodic chemical treatment. Further, anodic chemical treatment under super low pressure enables the electrode material to be used as an anodic material for an electrolytic capacitor. An example of the method for chemical treatment typically includes one that is similar to the method for chemical treatment designed for aluminum foil for electrolytic capacitor.

The fifth and sixth electrode materials for electrolytic capacitor employed in the present invention is an electrode material having a layer of valve metal particles furnished on the surface thereof with an oxide film, where the porosity of the layer of valve metal particles being between 20 and 60%, preferably between 22 and 58%, and even more preferably between 25 and 55%. Besides, the specific surface area is between $20 \times 10^3$ and $70 \times 10^3$ $cm^2/cm^3$, preferably between $30 \times 10^3$ and $60 \times 10^3$ $cm^2/cm^3$, and even more preferably between $35 \times 10^3$ and $55 \times 10^3$ $cm^2/cm^3$.

In addition, the above-mentioned electrode material has a layer of valve metal particles comprising the above-mentioned valve metal particles having diameters of 0.2 μm or greater, so that a large cavity can be formed among the valve metal particles. Hence, a cavity is hardly buried with an oxide film even when an anodic oxide film is formed by way of an anodic chemical treatment, and high capacitance can thus be obtained.

Besides, in the above-mentioned electrode material, the valve metal consists of aluminum, and the composition ratio of Al/O of the layer of valve metal particles furnished on the surface thereof with the oxide film is within the range of 2.0 to 125. so that the first electrode material can attain stable capacitance, and so that this content of oxygen improves the connectivity among the valve metal particles.

The electrode material is preferably subjected to an anodic chemical treatment so that the electrode material is used as an anodic material for electrolytic capacitor. An example of the method for chemical treatment typically includes one that is similar to the method for chemical treatment designed for aluminum foil for electrolytic capacitor.

In the third and fifth electrode material according to the present invention, a base material of between 50 and 200 μm in thickness is used, and preferably between 50 and 170 μm, and even more preferably between 60 and 150 μm. An example of the base material includes a variety of metals, preferably, aluminum. The aluminum is preferably between 99 wt % and 99.999 wt % in purity.

In the fourth and sixth electrode materials according to the present invention, a metal other than the aforementioned valve metal is used as a base material. When this other metal is copper or silver, the resistance of the electrode material is reduced, so that the ESR of the electrolytic capacitor that employs the electrode material is reduced.

The aforementioned electrode material can be obtained by way of the conventional deposition method. In order to form a layer of valve metal particles furnished on the surface thereof with an oxide film, a deposition is conducted in an inert gas atmosphere that includes oxygen. An example of the inert gas to be used includes argon and nitrogen. The pressure of the inert gas is preferably between 0.05 and 0.8 Pa, and the oxygen partial pressure is preferably one-tenth or less of the pressure of the inert gas.

Third Example

The present invention is described in more detail with reference to the Third Example as described below.

Working Example 3-1

In an atmosphere consisting of nitrogen under the pressure of 0.1 Pa and oxygen under the pressure of one-tenth or less of that of nitrogen, aluminum was deposited onto an aluminum sheet of 99.9 wt % and 102 μm, whereby the electrode material according to the present invention was created.

Working Example 3-2

In an atmosphere consisting of nitrogen under the pressure of 0.1 Pa and oxygen under the pressure of one-tenth or less of that of nitrogen, aluminum was deposited onto an aluminum sheet of 99.9 wt % and 100 μm, whereby the electrode material according to the present invention was created. Then, an anodic treatment was conducted by way of applying 20V of voltage in an adipic acid ammonium solution.

Working Example 4-1

In an atmosphere consisting of nitrogen under the pressure of 0.1 Pa and oxygen under the pressure of one-tenth or less of that of nitrogen, aluminum was deposited onto a copper sheet of 99.9 wt % and 61 μm, whereby the electrode material according to the present invention was created.

Working Example 4-2

In an atmosphere consisting of nitrogen under the pressure of 0.1 Pa and oxygen under the pressure of one-tenth or less of that of nitrogen, aluminum was deposited onto a copper sheet of 99.9 wt % and 60 μm, whereby the electrode material according to the present invention was created. Then, an anodic treatment was conducted by way of applying 20V of voltage in an adipic acid ammonium solution.

Comparative Example 5

An etching treatment was conducted wherein a mixture solution of hydrochloric acid, sulphuric acid and nitric acid was used as an electrolytic solution; and an alternating current with a frequency of 50 Hz or less and at a current density of 1 $A/cm^2$ or less was applied onto an aluminum sheet of 99.9 wt % in such a manner that the core would be 30 μm in thickness, whereby an etching foil was created.

Comparative Example 6

An etching treatment was conducted wherein a mixture solution of hydrochloric acid, sulphuric acid and nitric acid was used as an electrolytic solution; and an alternating current with a frequency of 20 Hz or less and at a current density of 1 $A/cm^2$ or less was applied onto an aluminum sheet of 99.9 wt % in such a manner that the core would be 30 μm in thickness, whereby an etching foil was created. Then, an anodic chemical treatment was conducted in the manner similar to the Working Example.

Table 3 shows the porosity, the specific surface area, the capacitance and the resistance of the metal particle layer or of the etching layer of the electrode material and the etching foil. The measured resistance value is a resistance value of an electrode material per unit area; in other words, the resistance value between end faces of an electrode material in the form of a regular tetragon.

TABLE 3

| | Thickness of Remaining Core (μm) | Porosity (%) | Specific Surface Area (cm²/cm³) | Capacitance (mF/cm³) | Resistance per Unit Area (mΩ) |
|---|---|---|---|---|---|
| Working Example 3-1 | 102 | 46 | $2.0 \times 10^5$ | 1340 | 0.30 |
| Working Example 3-2 | 100 | 44 | $5.1 \times 10^4$ | 29 | 0.29 |
| Working Example 4-1 | 61 | 44 | $2.2 \times 10^5$ | 1330 | 0.32 |
| Working Example 4-2 | 60 | 45 | $5.2 \times 10^4$ | 31 | 0.30 |
| Comparative Example 5 | 30 | 64 | $2.6 \times 10^4$ | 185 | 1.02 |
| Comparative Example 6 | 31 | 63 | $2.1 \times 10^4$ | 14 | 0.98 |

As discussed above, the electrode material and the chemically-treated electrode material of the present invention used in Working Examples 3-1 to 4-2 have capacitance 2 to 7 times as high as that of the conventional etching foil and the conventional chemically-treated foil used in Comparative Examples 5 and 6; and the electrode material and the chemically-treated electrode material of the present invention used in Working Examples 3-1 to 4-2 have lower resistance than the conventional etching foil and the conventional chemically-treated foil used in Comparative Examples 5 and 6. Hence, it is demonstrated that the electrode material and the chemically-treated electrode material of the present invention used in Working Examples 3-1 to 4-2 are unprecedented electrode materials for electrolytic capacitor that are appropriate for a capacitor used in a high-frequency region.

What is claimed is:

1. An electrode material for electrolytic capacitor comprising a layer of valve metal particles furnished on the surface thereof with an oxidation film, the layer having a porosity of 20 to 60% and a specific surface area of $30 \times 10^3$ to $400 \times 10^3$ cm²/cm³, wherein the valve metal particles are mixed together, with the particle diameters exhibiting a given distribution at least within the range of 0.005 to 0.1 μm, and form a base material surface.

2. The electrode material for electrolytic capacitor according to claim 1, wherein the valve metal consists of aluminum, and wherein the composition ratio of Al/O of the layer of valve metal particles furnished on the surface thereof with the oxide film is within the range of 2.0 to 5.5.

3. An electrode material for electrolytic capacitor comprising a layer of valve metal particles furnished on the surface thereof with an oxidation film, the layer having a porosity of 20 to 60% and a specific surface area of $20 \times 10^3$ to $70 \times 10^3$ cm²/cm³, wherein the valve metal particles include those having particle diameters of 0.2 μm or greater and form a base material surface.

4. The electrode material for electrolytic capacitor according to claim 3, wherein the valve metal consists of aluminum, and wherein the composition ratio of Al/O of the layer of valve metal particles furnished on the surface thereof with the oxide film is within the range of 2.0 to 125.

5. An electrode material for electrolytic capacitor comprising a layer of valve metal particles furnished on the surface thereof with an oxidation film, the layer having a porosity of 20 to 60% and a specific surface area of $30 \times 10^3$ to $400 \times 10^3$ cm²/cm³, wherein the valve metal particles are mixed together, with the particle diameters exhibiting a given distribution at least within the range of 0.005 to 0.1 μm, and form a base material surface of 50 to 200 μm in thickness.

6. The electrode material for electrolytic capacitor according claim 5, wherein the valve metal consists of aluminum, and wherein the composition ratio of Al/O of the layer of valve metal particles furnished on the surface thereof with the oxide film is within the range of 2.0 to 5.5.

7. An electrode material for electrolytic capacitor comprising a layer of valve metal particles furnished on the surface thereof with an oxidation film, the layer having a porosity of 20 to 60% and a specific surface area of $30 \times 10^3$ to $400 \times 10^3$ cm²/cm³, wherein the valve metal particles are mixed together, with the particle diameters exhibiting a given distribution at least within the range of 0.005 to 0.1 μm, and form a base material surface comprising a metal other than the valve metal.

8. The electrode material for electrolytic capacitor according to claim 7, wherein the valve metal consists of aluminum, and wherein the composition ratio of Al/O of the layer of valve metal particles furnished on the surface thereof with the oxide film is within the range of 2.0 to 5.5.

9. The electrode material for electrolytic capacitor according to claim 7, wherein the metal other than the valve metal is copper or silver.

10. The electrode material for electrolytic capacitor according to claim 9, wherein the valve metal consists of aluminum, and wherein the composition ratio of Al/O of the layer of valve metal particles furnished on the surface thereof with the oxide film is within the range of 2.0 to 5.5.

11. An electrode material for electrolytic capacitor comprising a layer of valve metal particles furnished on the surface thereof with an oxidation film, the layer having a porosity of 20 to 60% and a specific surface area of $20 \times 10^3$ to $70 \times 10^3$ cm²/cm³, wherein the valve metal particles include those having particle diameters of 0.2 μm or greater and form a base material surface of 50 to 200 μm in thickness.

12. The electrode material for electrolytic capacitor according claim 11, wherein the valve metal consists of aluminum, and wherein the composition ratio of Al/O of the layer of valve metal particles furnished on the surface thereof with the oxide film is within the range of 2.0 to 125.

13. The electrode material for electrolytic capacitor according to claim 11, wherein the valve metal consists of aluminum, and wherein the composition ratio of Al/O of the layer of valve metal particles furnished on the surface thereof with the oxide film is within the range of 2.0 to 125.

14. An electrode material for electrolytic capacitor comprising a layer of valve metal particles furnished on the surface thereof with an oxidation film, the layer having a porosity of 20 to 60% and a specific surface area of $20\times10^3$ to $70\times10^3$ $cm^2/cm^3$, wherein the valve metal particles include those having particle diameters of 0.2 μm or greater and form a base material surface comprising a metal other than the valve metal.

15. The electrode material for electrolytic capacitor according to claim 14, wherein the metal other than the valve metal is copper or silver.

16. The electrode material for electrolytic capacitor according to claim 14, wherein the valve metal consists of aluminum, and wherein the composition ratio of Al/O of the layer of valve metal particles furnished on the surface thereof with the oxide film is within the range of 2.0 to 125.

* * * * *